(12) United States Patent
Chretien et al.

(10) Patent No.: US 11,309,822 B2
(45) Date of Patent: Apr. 19, 2022

(54) ELECTRIC MOTORS AND DRIVE CIRCUITS THEREFOR

(71) Applicant: Regal Beloit America, Inc., Beloit, WI (US)

(72) Inventors: Ludovic Andre Chretien, Columbia, IN (US); Roger C. Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 201 days.

(21) Appl. No.: 16/839,989

(22) Filed: Apr. 3, 2020

(65) Prior Publication Data

US 2021/0313918 A1    Oct. 7, 2021

(51) Int. Cl.
*H02P 27/06* (2006.01)
*H02P 25/022* (2016.01)

(52) U.S. Cl.
CPC ............ *H02P 27/06* (2013.01); *H02P 25/022* (2013.01)

(58) Field of Classification Search
CPC .............................. H02P 27/06; H02P 25/022
See application file for complete search history.

(56) References Cited

U.S. PATENT DOCUMENTS

| | | | |
|---|---|---|---|
| 7,567,049 B2 | 7/2009 | Shahi et al. | |
| 8,408,878 B2 | 4/2013 | Shahi et al. | |
| 9,631,830 B2 | 4/2017 | Sasaki | |
| 9,732,976 B2 | 8/2017 | Wang et al. | |
| 9,806,660 B1 | 10/2017 | Chretien et al. | |
| 2009/0001921 A1* | 1/2009 | Mills, Jr. ................. | F04B 49/02 318/748 |
| 2019/0199239 A1* | 6/2019 | Ohashi .................... | H02P 27/06 |
| 2019/0305708 A1* | 10/2019 | Chretien ................. | H02P 27/06 |

* cited by examiner

*Primary Examiner* — Zoheb S Imtiaz
(74) *Attorney, Agent, or Firm* — Armstrong Teasdale LLP

(57) ABSTRACT

Electric motors and drive circuits therefor are described herein. The drive circuit is configured to operate in a first mode of operation and a second mode of operation. The drive circuit includes an inverter configured to regulate current to a first winding and a second winding of the electric motor in the first mode of operation and to only the first winding in the second mode of operation. The drive circuit also includes a first switch coupled to the second winding and configured to supply line frequency current to the second winding at a first node in the second mode of operation, and a second switch coupled to the second winding and configured to enable selection of regulating current to the second winding using the inverter in the first mode of operation or supplying the line frequency current directly to the second winding in the second mode of operation.

20 Claims, 5 Drawing Sheets

ELECTRIC MOTORS AND DRIVE CIRCUITS THEREFOR

BACKGROUND

The field of the disclosure relates generally to electric motors, and specifically to electric motors including independent windings and to induction motors with load-shifting drive circuits.

At least some known induction motors are fixed speed motors that operate most efficiently at line frequency power. Such motors exhibit uncontrolled acceleration during startup. Further, at low load conditions, such motors operate less efficiently. Alternatively, some induction motors may be driven with a variable speed motor controller to adapt motor speed to a load level. Such configurations are generally limited by power factor, electromagnetic interference, and electrical losses.

A drive circuit for certain motors enables efficient operation at both high and low load conditions. For example, a motor operating a compressor in a heating, ventilation and air conditioning (HVAC) system may experience high load conditions during peak temperatures and low load conditions during milder temperatures. The drive circuit operates the motor using an inverter under low load conditions, and operates the motor using line frequency power under high load conditions.

BRIEF DESCRIPTION

In one aspect, a drive circuit for an electric motor is provided. The drive circuit is configured to operate in a first mode of operation and a second mode of operation. The drive circuit includes an inverter configured to regulate current to a first winding and a second winding of the electric motor in the first mode of operation and to only the first winding in the second mode of operation. The drive circuit also includes a first switch coupled to the second winding and configured to enable selection of regulating current to the second winding using the inverter in the first mode of operation or supplying line frequency current directly to the second winding in the second mode of operation, and a second switch coupled to the second winding and configured to supply the line frequency current to the second winding at a first node in the second mode of operation.

In another aspect, a two-phase induction motor is provided. The two-phase induction motor includes a first winding, a second winding, and a drive circuit for operating the two-phase induction motor in a first mode of operation and a second mode of operation. The drive circuit includes an inverter configured to regulate current to the first winding and the second winding in the first mode of operation and to only the first winding in the second mode of operation. The drive circuit also includes a first switch coupled to the second winding and configured to enable selection of regulating current to the second winding using the inverter in the first mode of operation or supplying line frequency current directly to the second winding in the second mode of operation, and a second switch coupled to the second winding and configured to supply the line frequency current to the second winding at a first node in the second mode of operation.

In yet another aspect, a method of operating a two-phase induction motor is provided. The method includes regulating, according to a first mode of operation, current provided to a first winding and a second winding of the induction motor. The method also includes commutating a first switch in series with the second winding, and closing a second switch in series with the second winding to supply line frequency current to the second winding according to a second mode of operation, while regulating the current provided to the first winding.

In a further aspect, a two-phase permanent magnet motor is provided. The two-phase permanent magnet motor includes a first winding, a second winding, and a drive circuit for operating the two-phase permanent magnet motor in a first mode of operation and a second mode of operation. The drive circuit includes an inverter configured to regulate current to the first winding and the second winding in the first mode of operation and to only the first winding in the second mode of operation. The drive circuit also includes a first switch coupled to the second winding and configured to enable selection of regulating current to the second winding using the inverter in the first mode of operation or supplying line frequency current directly to the second winding in the second mode of operation, and a second switch coupled to the second winding and configured to supply the line frequency current to the second winding at a first node in the second mode of operation.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
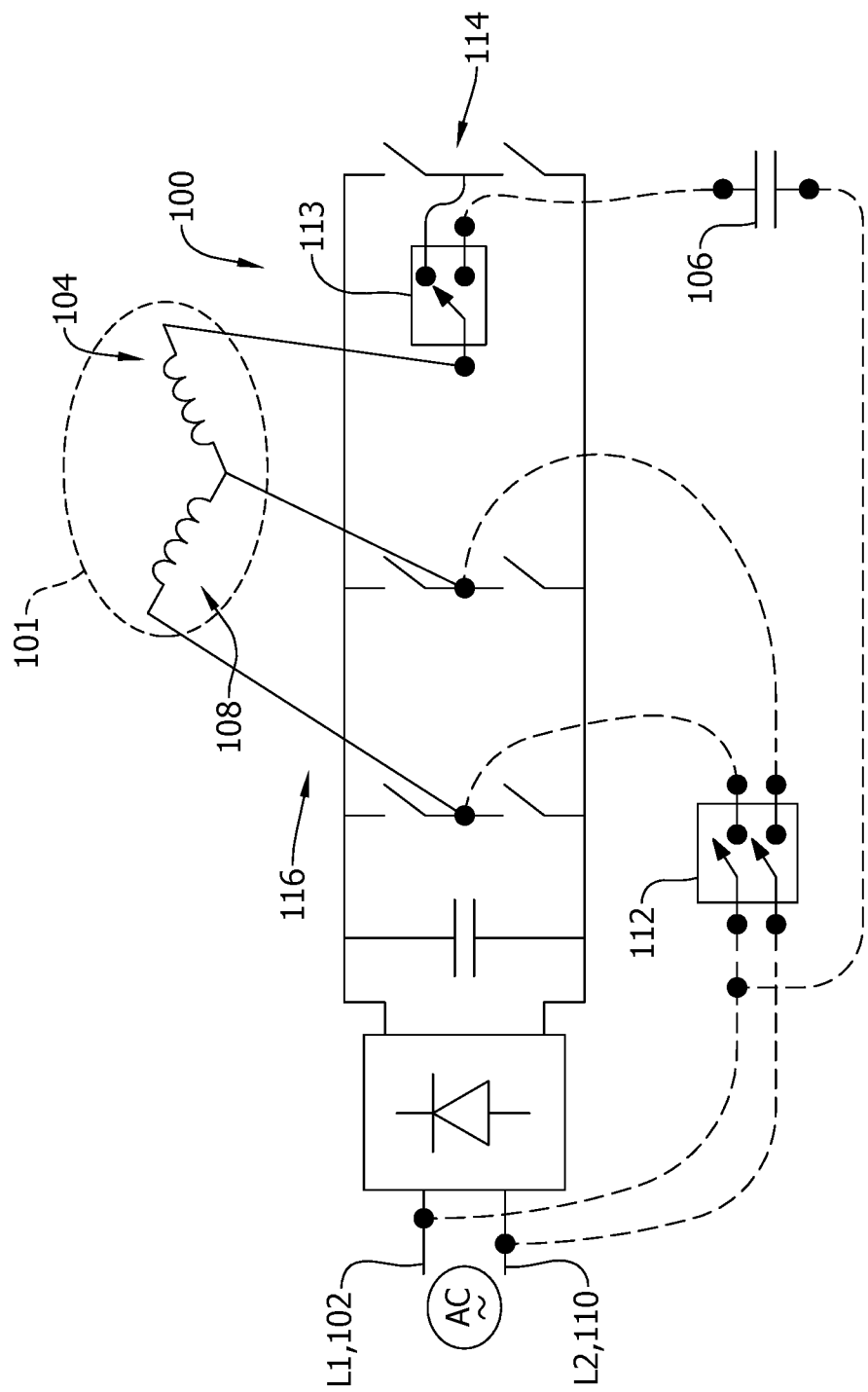
FIG. 1 is a schematic diagram of a known drive circuit for an electric motor.

FIG. 1 is a schematic diagram of known drive circuit 100 for an electric motor 101, such as a PSC motor. During normal line frequency operation, line frequency current, such as 50 Hertz or 60 Hertz, for example, is supplied on a first line, or L1, 102, through a run capacitor 106, to a start winding 104, and to a main winding 108. A second line, or L2, 110 provides a return, or neutral, for the line frequency current. Drive circuit 100 includes a contactor 112 for connecting and disconnecting L1 and L2 to the PSC motor. Contactor 112 is a two pole mechanical contactor that is commutated by energizing a coil (not shown). In certain embodiments, run capacitor 106 may be coupled to L1 on either side of contactor 112. A relay 113 is coupled between run capacitor 106 and start winding 104.

Drive circuit 100 includes an inverter 114 that is enabled to drive electric motor 101 with variable frequency power under low load, or at least less than full load, conditions. Inverter 114 is supplied line frequency power on L1 and L2. Inverter 114 enables variable speed operation of electric motor 101 by regulating amplitude, phase, and frequency of alternating current (AC) voltages on output terminals thereof, which are coupled to main winding 108 and start winding 104. When operating electric motor 101 using inverter 114, contactor 112 is open and inverter 114 is enabled via any suitable control means. To transition to line frequency power, inverter 114 is disabled, contactor 112 is closed, and relay 113 is commutated to couple L1 and L2 directly to electric motor 101.

As shown in FIG. 1, drive circuit 100 includes six wired connections, contactor 112, and run capacitor 106. These components contribute to a relatively high cost and complexity of drive circuit 100. Moreover, electric motor 101 includes integrated winding connections 116. In particular, winding connections 116 between drive circuit 100 and windings 104, 108 are integrated or tied, such that at least one connection is coupled to both main winding 108 and start winding 104. Although electric motor 101 is illustrated as a PSC motor, it is recognized that other known motors (such as electronically commutated motors (ECMs)) also have integrated windings (e.g., between windings of a three-phase ECM).

Figure 2:
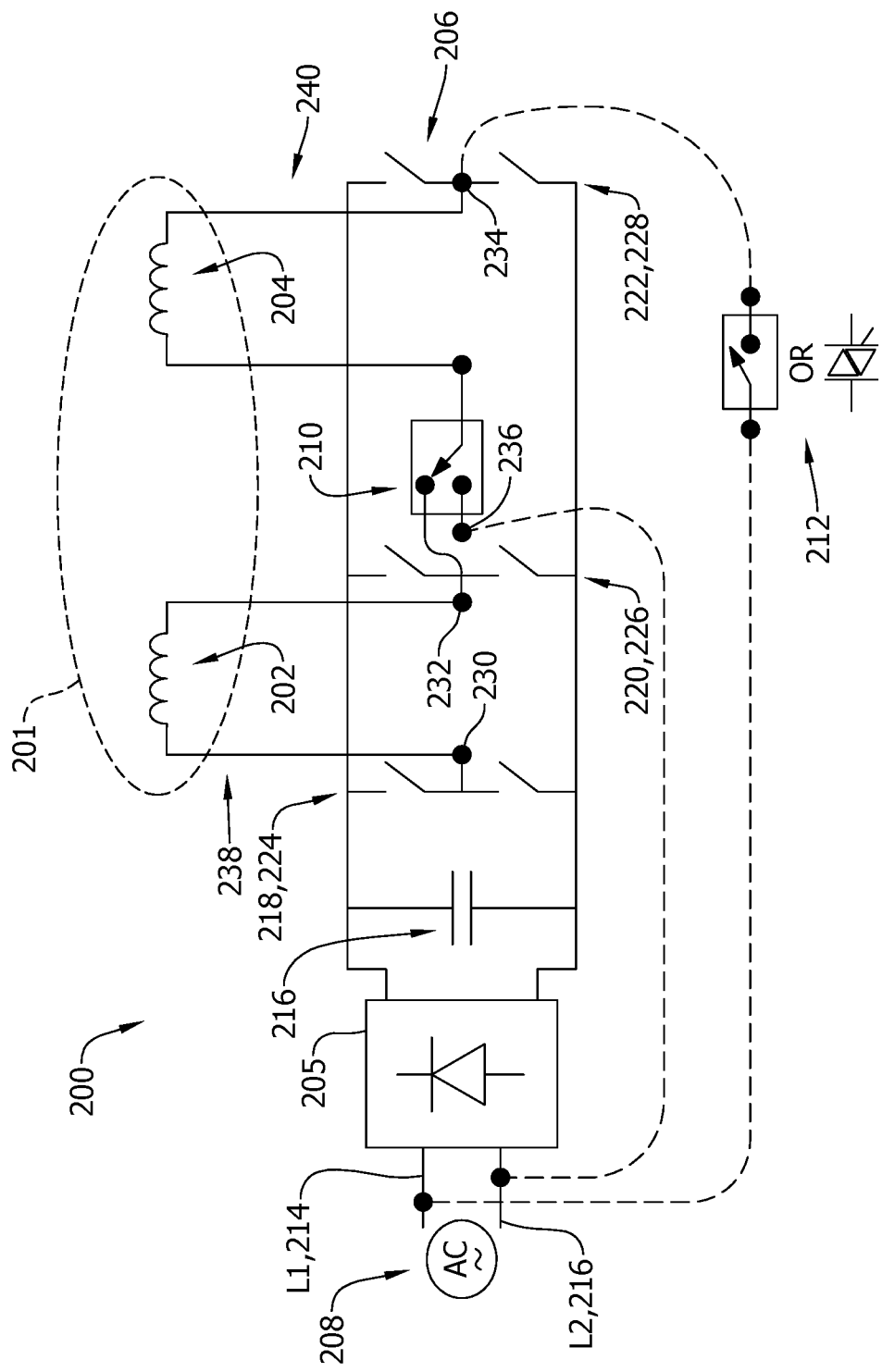
FIG. 2 is a schematic diagram of an exemplary load-shifting drive circuit for an electric motor, in accordance with the present disclosure.
Figure 3:
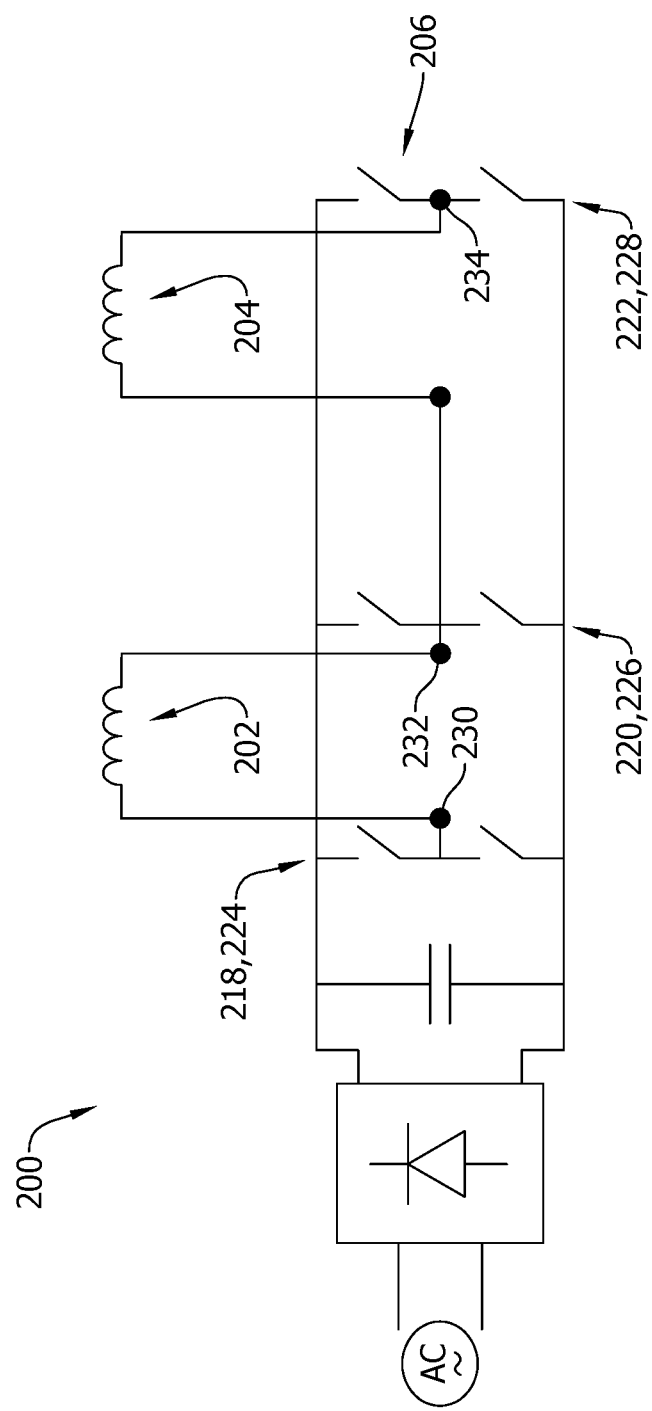
FIG. 3 is a schematic diagram of the load-shifting drive circuit shown in FIG. 2 in a first mode of operation.
Figure 4:
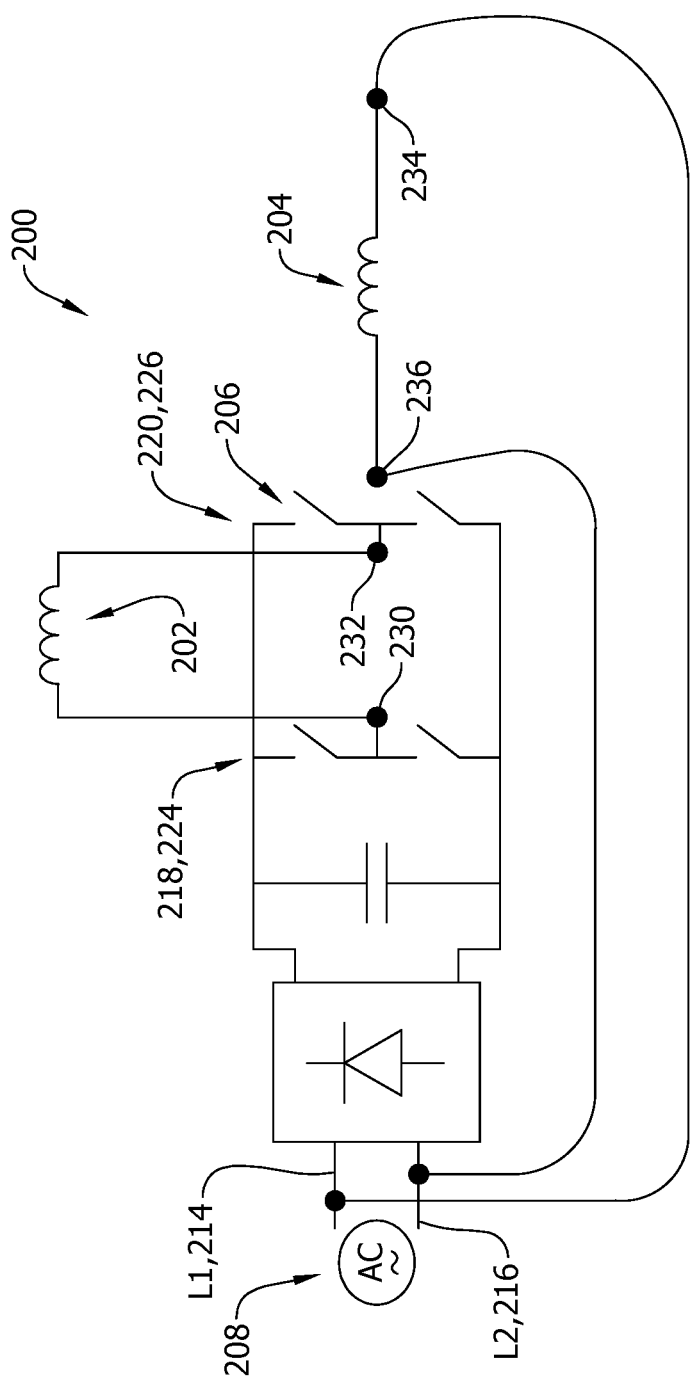
FIG. 4 is a schematic diagram of the load-shifting drive circuit shown in FIG. 2 in a second mode of operation.

FIG. 2 is a schematic diagram of an exemplary load-shifting drive circuit 200, in accordance with the present disclosure. FIG. 3 shows drive circuit 200 is configured to drive an electric motor 201 (e.g., an induction motor) according to a first mode of operation under partial load conditions, and FIG. 4 shows drive circuit 200 configured to drive electric motor 201 according to a second mode of operation under full load conditions. Broadly, under the first mode of operation, two windings 202, 204 of electric motor 201 are driven using an inverter 206; and under the second mode of operation, first winding 202 is driven using inverter 206 and second winding 204 is driven directly with line frequency current from an AC source 208. The terms line frequency current, voltage, and/or power are used interchangeably herein to refer to direct electrical communication with AC source 208.

In particular, drive circuit 200 includes a rectifier 205, inverter 206 downstream from rectifier 205, a first switch (e.g., a relay) 210 in series with second winding 204, and a second switch (e.g., a contactor) 212. First switch 210 and/or second switch 212 may be embodied as mechanical/electro-mechanical contactors, electronic switches, and/or or solid-state switches. Under the first mode of operation, as shown in the equivalent circuit depicted in FIG. 3, second switch 212 is open, and drive circuit 200 is configured to drive the induction motor using inverter 206. Inverter 206 enables variable speed operation of the induction motor by regulating current provided to first winding 202 and second winding 204, by controlling amplitude, phase, and frequency of current and voltage on output terminals thereof, which are coupled to first winding 202 and second winding 204.

In the illustrated embodiment, inverter 206 includes a capacitor 216 and a plurality of switches arranged in three parallel sets of switches 218, 220, 222, also referred to as phases 224, 226, and 228, respectively, of inverter 206 (e.g., first set of switches 218 may be referred to as a first phase 224 of inverter, second set of switches 220 may be referred to as a second phase 226 of inverter 206, and third set of switches 222 may be referred to as a third phase 228 of inverter 206). First winding 202 is coupled to first phase 224 at a first node 230 and to second phase 226 at a second node 232. Under the first mode of operation of drive circuit 200, second winding 204 is coupled to third phase 228 at a third node 234 and is coupled to second phase 226 through first switch 210.

Rectifier 205 rectifies power from AC source, capacitor 216 functions as a storage element for the rectified power from rectifier 205, and sets of switches 218, 220, 222 (phases 224, 226, and 228) operate to regulate current provided to windings 202, 204, in the first mode of operation.

To transition to the second mode of operation, shown in the equivalent circuit depicted in FIG. 4, third set of switches 222 (third phase 228 of inverter 206) is disabled (e.g., switches 222 are opened), first switch 210 is commutated, and second switch 212 is closed, to couple AC source 208 directly to second winding 204. In transitioning from the first mode of operation to the second mode of operation, as shown in the equivalent circuit depicted in FIG. 4, the load is shifted from inverter 206 to both inverter 206 and line frequency voltage and current from AC source 208. Second winding 204 is coupled to AC source 208 through a first line, L1, 214, at third node 234, through (closed) second switch 212. Second winding 204 is also coupled to AC source 208 through a second (return or neutral) line, L2, 216, at a fourth node 236, through first switch 210. First winding 202 remains coupled to inverter 206. More specifically, first winding 202 remains coupled to first phase 224 at first node 230 and to second phase 226 at second node 232, and sets of switches 218, 220 (first and second phases 224, 226 of inverter 206) operate to regulate current to first winding 202.

First switch 210 and/or second switch 212 may be controlled (e.g., closed, opened, commutated) by any suitable control means, such as, for example, a microcontroller, a field programmable gate array (FPGA), a digital signal processing (DSP) device, a remote system controller, a local system controller, and the like. First switch 210 and/or second switch 212 may be controlled to enable switching between the first and second modes of operation (e.g., driving second winding 204 using inverter 206 or directly with line frequency voltage and current from AC source 208) within about 1 line cycle or less.

In one example, a compressor driven by the induction motor 201 has a 5 kW full load power requirement and a 2.5 kW partial load power requirement. When operating under partial load conditions, or according to the first mode of operation of drive circuit 200, inverter 206 is supplied line frequency power, of 2.5 kW, on L1 and L2. Both windings 202, 204 are driven using inverter 206, and the load is divided therebetween (e.g., 1.25 kW on first winding 202 and 1.25 kW on second winding 204).

When operating under full load conditions, or according to the second mode of operation, inverter 206 is still supplied line frequency power on L1 and L2, of 2.5 kW. First winding 202 is driven using inverter 206, with the full load from inverter 206, 2.5 kW, on first winding 202. Second winding 204 is driven with line frequency voltage and current from AC source 208, over L1 and L2, also of 2.5 kW. Accordingly, full power is supplied to the compressor under the full load conditions. However, full power is not supplied through inverter 206, and inverter 206 need only be rated to supply partial power, which enables reducing the size, cost, and/or complexity of inverter 206.

In the exemplary embodiment, electric motor 201 includes independent winding connections 238, 240 between drive circuit 200 and first winding 202 and between drive circuit 200 and second winding 204, respectively. In some embodiments, connections 238, 240 to windings 202, 204 are made external to electric motor 201 such that connections 238, 240 to windings 202, 204 can be made independent. Accordingly, drive circuit 200 operates as described above, with only one winding (e.g., second winding 204) directly coupled to AC source 208 (shown in FIG. 2) in the second mode of operation. Windings 202, 204 are electrically isolated in the second mode of operation of drive circuit 200.

Drive circuit 200 eliminates the run capacitor (e.g., run capacitor 106) of known hybrid drive circuits. Accordingly, motors (e.g., electric motor 201) using drive circuit 200 are distinct from permanent split capacitor motors.

In addition, drive circuit 200 has a simplified wiring scheme, compared to drive circuit 100 and other known drive circuits. In particular, drive circuit 200 includes a reduced number of wiring connections. In some embodiments, first switch 210 is integrated into an internal printed circuit board (not shown), and therefore the wiring between first switch 210 and L1 is incorporated into that printed circuit board. In some embodiments, the wiring connection between L2 and second switch 212, and between second switch 212 and second winding 204 is external, and drive circuit 200 includes only two external connections. In other embodiments, these wiring connections are also fully integrated, thereby eliminating external wiring connections.

Electric motor 201 may be an induction motor, such as a PSC motor, or a permanent magnet motor, such as an ECM. Moreover, electric motor 201 may drive a compressor, or may drive any other fluid-moving apparatus, such as a fan, blower, impeller, pump, and the like.

Figure 5:
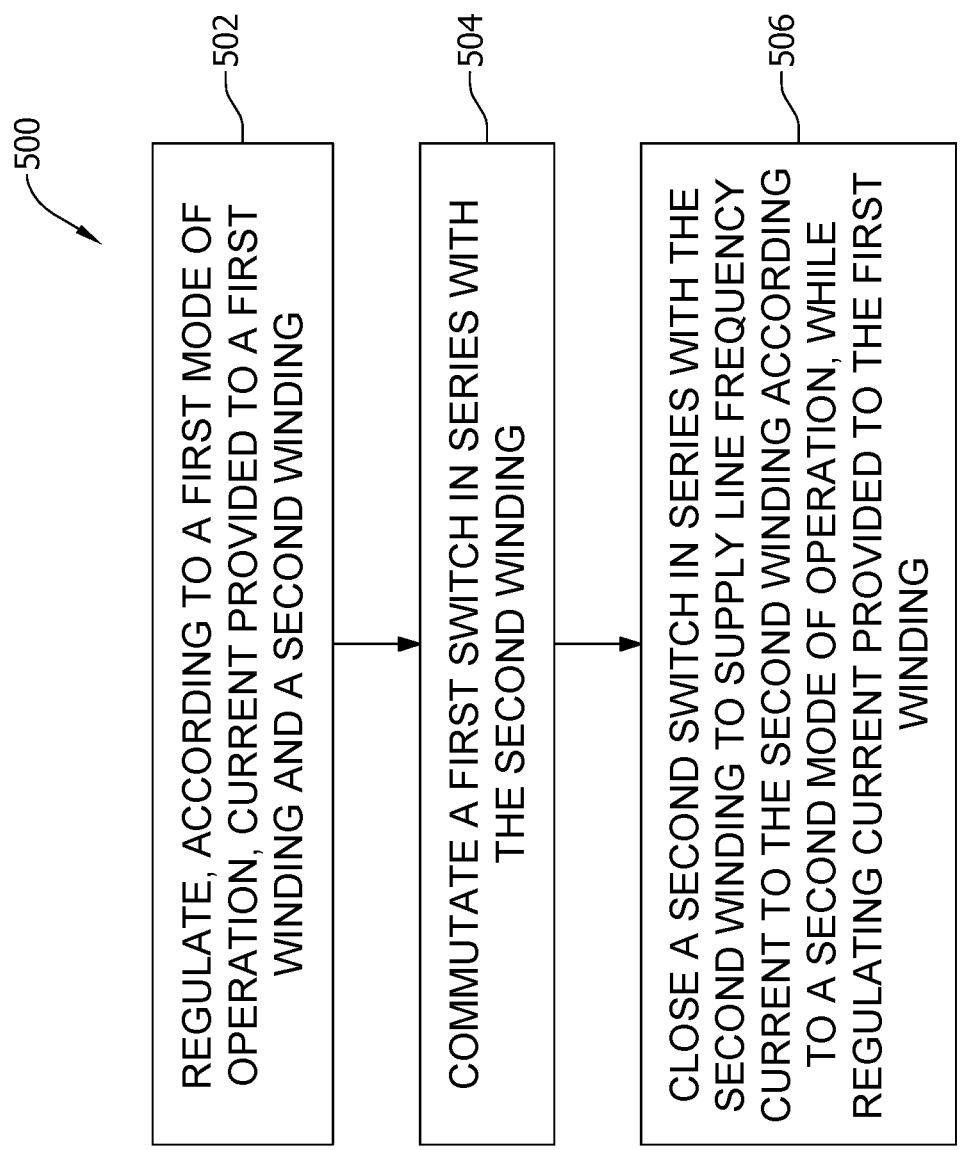
FIG. 5 is a flow diagram of an exemplary method of operating a motor.

FIG. 5 is a flow diagram of an exemplary method 500 of operating an electric motor (e.g., electric motor 201, shown in FIG. 2), such as an induction motor or a permanent magnet motor. Method 500 transitions operation of electric motor 201 from being driven by an inverter (e.g., inverter 206, shown in FIG. 2) to being driven partially by inverter 206 and partially directly by an AC power source (e.g., AC source 208, also shown in FIG. 2).

Method 500 begins with regulating 502, according to a first mode of operation, current provided to a first winding (e.g., winding 202, shown in FIG. 2) and a second winding (e.g., winding 204, also shown in FIG. 2) of motor 201. Method 500 also includes commutating 504 a first switch (e.g., first switch 210, shown in FIG. 2) in series with second winding 204, and closing 506 a second switch (e.g., second switch 212, also shown in FIG. 2) in series with second winding 204 to supply line frequency current to second winding 204 according to a second mode of operation, while regulating the current provided to first winding 202.

In some embodiments, supplying 502 includes supplying a first amount of power shared between first winding 202 and second winding 204, and method 500 further includes supplying second winding 204 with a second amount of power using the line frequency current while supplying only first winding 202 with the first amount of power using the regulated current.

Some embodiments involve the use of one or more electronic or computing devices (e.g., for controlling operation of a drive circuit and/or individual components thereof). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive circuit for an electric motor configured to operate in a first mode of operation and a second mode of operation, said drive circuit comprising:
   an inverter configured to regulate current to a first winding and a second winding of the electric motor in the first mode of operation and to only the first winding in the second mode of operation;
   a first switch coupled to the second winding and configured to enable selection of regulating current to the second winding using said inverter in the first mode of operation or supplying line frequency current directly to the second winding in the second mode of operation; and
   a second switch coupled to the second winding and configured to supply the line frequency current to the second winding at a first node in the second mode of operation.

2. The drive circuit of claim 1, wherein a first phase of said inverter is coupled to the first winding at a second node and a second phase of said inverter is coupled to the first winding at a third node.

3. The drive circuit of claim 2, wherein said second phase of said inverter is coupled to the second winding in the first mode of operation.

4. The drive circuit of claim 2, wherein a third phase of said inverter is coupled to the second winding at said first node in the first mode of operation.

5. The drive circuit of claim 1, wherein the second winding is coupled to an alternating current (AC) power source through said first switch and said second switch.

6. The drive circuit of claim 1, wherein each of said first switch and said second switch comprises one of a mechanical contactor or a solid-state switch.

7. The drive circuit of claim 1, wherein the drive circuit operates in the first mode of operation under partial load conditions and in the second mode of operation under full load conditions.

8. The drive circuit of claim 1, wherein, in the first mode of operation, said inverter supplies a first amount of power that is shared between the first winding and the second winding, and in the second mode of operation, said inverter supplies the first amount of power to the first winding, and the second winding is supplied a second amount of power from an AC power source.

9. The drive circuit of claim 7, wherein the second amount of power is equal to the first amount of power.

10. A two-phase induction motor comprising:
a first winding;
a second winding; and
a drive circuit for operating the two-phase induction motor in a first mode of operation and a second mode of operation, said drive circuit comprising:
an inverter configured to regulate current to said first winding and said second winding in the first mode of operation and to only said first winding in the second mode of operation;
a first switch coupled to said second winding and configured to enable selection of regulating current to said second winding using said inverter in the first mode of operation or supplying line frequency current directly to said second winding in the second mode of operation; and
a second switch coupled to said second winding and configured to supply the line frequency current to said second winding at a first node in the second mode of operation.

11. The two-phase induction motor of claim 10, further comprising independent wiring connections to said first winding and said second winding such that said first winding and said second winding are electrically isolated when said drive circuit is operating in the second mode of operation.

12. The two-phase induction motor of claim 10, wherein a first phase of said inverter is coupled to said first winding at a second node and a second phase of said inverter is coupled to said first winding at a third node.

13. The two-phase induction motor of claim 12, wherein said second phase of said inverter is coupled to said second winding in the first mode of operation.

14. The two-phase induction motor of claim 12, wherein a third phase of said inverter is coupled to said second winding at said first node in the first mode of operation.

15. The two-phase induction motor of claim 10, wherein said second winding is coupled to an alternating current (AC) power source through said first switch and said second switch.

16. The two-phase induction motor of claim 10, wherein each of said first switch and said second switch comprises one of a mechanical contactor or a solid-state switch.

17. The two-phase induction motor of claim 10, wherein said drive circuit operates in the first mode of operation under partial load conditions and in the second mode of operation under full load conditions.

18. A method of operating a two-phase induction motor, said method comprising:
regulating, according to a first mode of operation, current provided to a first winding and a second winding of the induction motor;
commutating a first switch in series with the second winding; and
closing a second switch in series with the second winding to supply line frequency current to the second winding according to a second mode of operation, while regulating the current provided to the first winding.

19. The method of claim 18, wherein regulating the current comprises supplying a first amount of power shared between the first winding and the second winding, said method further comprising:
supplying the second winding with a second amount of power using the line frequency current while supplying only the first winding with the first amount of power using the regulated current.

20. A two-phase permanent magnet motor comprising:
a first winding;
a second winding; and
a drive circuit for operating the two-phase permanent magnet motor in a first mode of operation and a second mode of operation, said drive circuit comprising:
an inverter configured to regulate current to said first winding and said second winding in the first mode of operation and to only said first winding in the second mode of operation;
a first switch coupled to said second winding and configured to enable selection of regulating current to said second winding using said inverter in the first mode of operation or supplying line frequency current directly to said second winding in the second mode of operation; and
a second switch coupled to said second winding and configured to supply the line frequency current to said second winding at a first node in the second mode of operation.

* * * * *